(12) United States Patent
Klode et al.

(10) Patent No.: US 11,920,615 B2
(45) Date of Patent: Mar. 5, 2024

(54) HYDRAULIC FLUID FLOW CONTROL

(71) Applicant: GOODRICH CORPORATION, Charlotte, NC (US)

(72) Inventors: Harald Klode, Centerville, OH (US); Jason Bradley Allen, Waco, TX (US)

(73) Assignee: GOODRICH CORPORATION, Charlotte, NC (US)

(*) Notice: Subject to any disclaimer, the term of this patent is extended or adjusted under 35 U.S.C. 154(b) by 0 days.

(21) Appl. No.: 17/723,891

(22) Filed: Apr. 19, 2022

(65) Prior Publication Data
US 2023/0332627 A1 Oct. 19, 2023

(51) Int. Cl.
*F15B 15/02* (2006.01)
*F03C 2/08* (2006.01)
*F04C 15/00* (2006.01)
*F16D 57/00* (2006.01)
*F16F 9/53* (2006.01)
*F16H 61/44* (2006.01)
*F16H 61/444* (2010.01)

(52) U.S. Cl.
CPC ............ *F15B 15/02* (2013.01); *F03C 2/08* (2013.01); *F04C 15/0061* (2013.01); *F04C 15/0084* (2013.01); *F16D 57/002* (2013.01); *F16F 9/532* (2013.01); *F16F 9/535* (2013.01); *F16H 61/44* (2013.01); *F16H 61/444* (2013.01); *F04C 2240/81* (2013.01); *F04C 2270/0525* (2013.01); *F15B 2211/40* (2013.01); *F15B 2211/4053* (2013.01); *F15B 2211/715* (2013.01)

(58) Field of Classification Search
CPC ....... B60T 1/12; B60T 10/02; F15B 2211/715
See application file for complete search history.

(56) References Cited

U.S. PATENT DOCUMENTS

| | | | |
|---|---|---|---|
| 4,926,985 A | 5/1990 | Mizuno et al. | |
| 5,161,653 A | 11/1992 | Hare, Sr. | |
| 6,352,143 B1 * | 3/2002 | Niaura | F16F 9/532 188/267.2 |
| 6,854,573 B2 | 2/2005 | Jolly et al. | |
| 6,910,699 B2 | 6/2005 | Cherney | |
| 8,333,069 B2 | 12/2012 | Hieren et al. | |
| 8,622,864 B2 | 1/2014 | Fauteux et al. | |

(Continued)

FOREIGN PATENT DOCUMENTS

| | | | |
|---|---|---|---|
| CN | 204355018 U | * | 5/2015 |
| CN | 206386221 U | * | 8/2017 |

(Continued)

OTHER PUBLICATIONS

USPTO; Non-Final Office Action dated Nov. 25, 2022 in U.S. Appl. No. 17/192,665.

(Continued)

*Primary Examiner* — Thomas E Lazo
(74) *Attorney, Agent, or Firm* — SNELL & WILMER L.L.P.

(57) ABSTRACT

A hydraulic fluid system is disclosed herein. The hydraulic fluid system includes a hydraulic motor including an output shaft, a reduction gear box having a first side and an opposing second side, the reduction gear box being coupled to the output shaft at the first side and coupled to a reduction shaft at the second side, and a magneto-rheological fluid brake (MRF) brake coupled to the reduction shaft.

18 Claims, 4 Drawing Sheets

(56) References Cited

U.S. PATENT DOCUMENTS

| | | | |
|---|---|---|---|
| 2011/0045932 A1 | 2/2011 | Fauteux et al. | |
| 2012/0291732 A1* | 11/2012 | Oe | B60T 10/00 |
| | | | 188/267.2 |
| 2018/0216682 A1 | 8/2018 | Larose et al. | |
| 2018/0298976 A1* | 10/2018 | Battlogg | F16F 9/12 |
| 2019/0040927 A1 | 2/2019 | Funke | |
| 2019/0345841 A1 | 11/2019 | Kang | |

FOREIGN PATENT DOCUMENTS

| | | |
|---|---|---|
| CN | 109941902 | 6/2019 |
| EP | 1482200 | 12/2004 |
| EP | 3896315 | 10/2021 |
| JP | 06953069 | 10/2021 |
| WO | 2019052072 A1 | 3/2019 |

OTHER PUBLICATIONS

European Patent Office, European Search Report dated Sep. 20, 2021 in Application No. 21168146.5.
Database WPI Week 201962 Thomson Scientific, London, GB; AN 2019-58452V XP002804156, 1 page.
USPTO; Final Office Action dated Mar. 13, 2023 in U.S. Appl. No. 17/192,665.
USPTO; Notice of Allowance dated Jun. 14, 2023 in U.S. Appl. No. 17/192,665.
USPTO; Corrective Notice of Allowance dated Aug. 16, 2023 in U.S. Appl. No. 17/192,665.
European Patent Office, European Search Report dated Aug. 23, 2023 in Application No. 23168815.1.

* cited by examiner

HYDRAULIC FLUID FLOW CONTROL

FIELD

The present disclosure generally relates to hydraulics and, more particularly, to controlling hydraulic fluid flow.

BACKGROUND

Existing applications that use magneto-rheological (MR) fluid to manipulate the fluid pressure relationship in a hydraulic fluid system are typically limited to applications compatible with certain MR fluid properties. MR fluid has a high density and includes ferromagnetic particles. Various aerospace applications prefer recirculation of hydraulic fluid that is void of any solid phase particles and provides relatively low fluid density.

SUMMARY

A hydraulic fluid system is disclosed herein. The hydraulic fluid system including a hydraulic motor including an output shaft, a reduction gear box having a first side and an opposing second side, the reduction gear box being coupled to the output shaft at the first side and coupled to a reduction shaft at the second side, and a magneto-rheological fluid brake (MRF) brake coupled to the reduction shaft.

In various embodiments, the hydraulic motor further includes an idler gear, and an output gear, where the output gear is coupled to the output shaft.

In various embodiments, the reduction gear box further includes a first gear coupled to the output shaft and a second gear configured to operate with the first gear, the second gear being coupled to the reduction shaft.

In various embodiments, the reduction gear box has a reduction ratio of about 2:1 to about 20:1.

In various embodiments, the reduction gear box further comprises a planetary gear having an input coupled to the output shaft and an output coupled to the reduction shaft.

In various embodiments, the output shaft has a first diameter and the reduction shaft as a second diameter, the second diameter being smaller than the first diameter.

In various embodiments, the hydraulic motor, the reduction gear box, and the MRF brake define a first set, the hydraulic fluid system further including a second hydraulic motor, a second reduction gear box coupled to the second hydraulic motor, and a second MRF brake coupled to the second reduction gear box, wherein the second hydraulic motor, the second reduction gear box, and the second MRF brake define a second set, and wherein the first set and the second set are connected in series.

In various embodiments, the MRF brake comprises a controller configured to receive an input based on the operation of the hydraulic motor.

In various embodiments, the hydraulic fluid system further includes a first housing enclosing the hydraulic motor and a second housing enclosing the reduction gear box and the MRF brake, the first housing being completely separate from the second housing.

Also disclosed herein is a hydraulic fluid system. The hydraulic fluid system includes a hydraulic motor having a first output shaft, a gear box having a second output shaft, the gear box being coupled to the first output shaft, and a magneto-rheological fluid (MRF) brake having a third output shaft, the MRF brake being coupled to the second output shaft.

In various embodiments, the hydraulic fluid system further includes a speed sensor associated with the third output shaft and a controller configured to receive input from the speed sensor and control the MRF brake in response to the input received from the speed sensor.

In various embodiments, wherein the gear box further includes an input gear coupled to the first output shaft and an output gear coupled to the input gear, wherein the output gear is configured to drive the second output shaft.

In various embodiments, the input gear is larger than the output gear.

In various embodiments, the ratio of the input gear to the output gear is about 5:1 to about 10:1.

In various embodiments, the input gear and the output gear are part of a planetary gear.

In various embodiments, the hydraulic fluid system further includes a first housing enclosing the gear box and the MRF brake and a second housing enclosing the first housing and the hydraulic motor.

In various embodiments, the first output shaft has a first diameter, wherein the second output shaft has a second diameter, and wherein the first diameter is larger than the second diameter.

Also disclosed herein is a hydraulic fluid system. The hydraulic fluid system includes a hydraulic motor configured, a reduction gear assembly including an input gear and an output gear operatively coupled to the hydraulic motor, a magneto-rheological fluid (MRF) brake operatively coupled to the hydraulic motor through the reduction gear assembly, and a controller configured to control a braking torque of the MRF brake to manage a speed of the hydraulic motor.

In various embodiments, a ratio of input gear to the output gear is greater than 2:1.

In various embodiments, a ratio of input gear to the output gear is about 3:1 to about 15:1.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
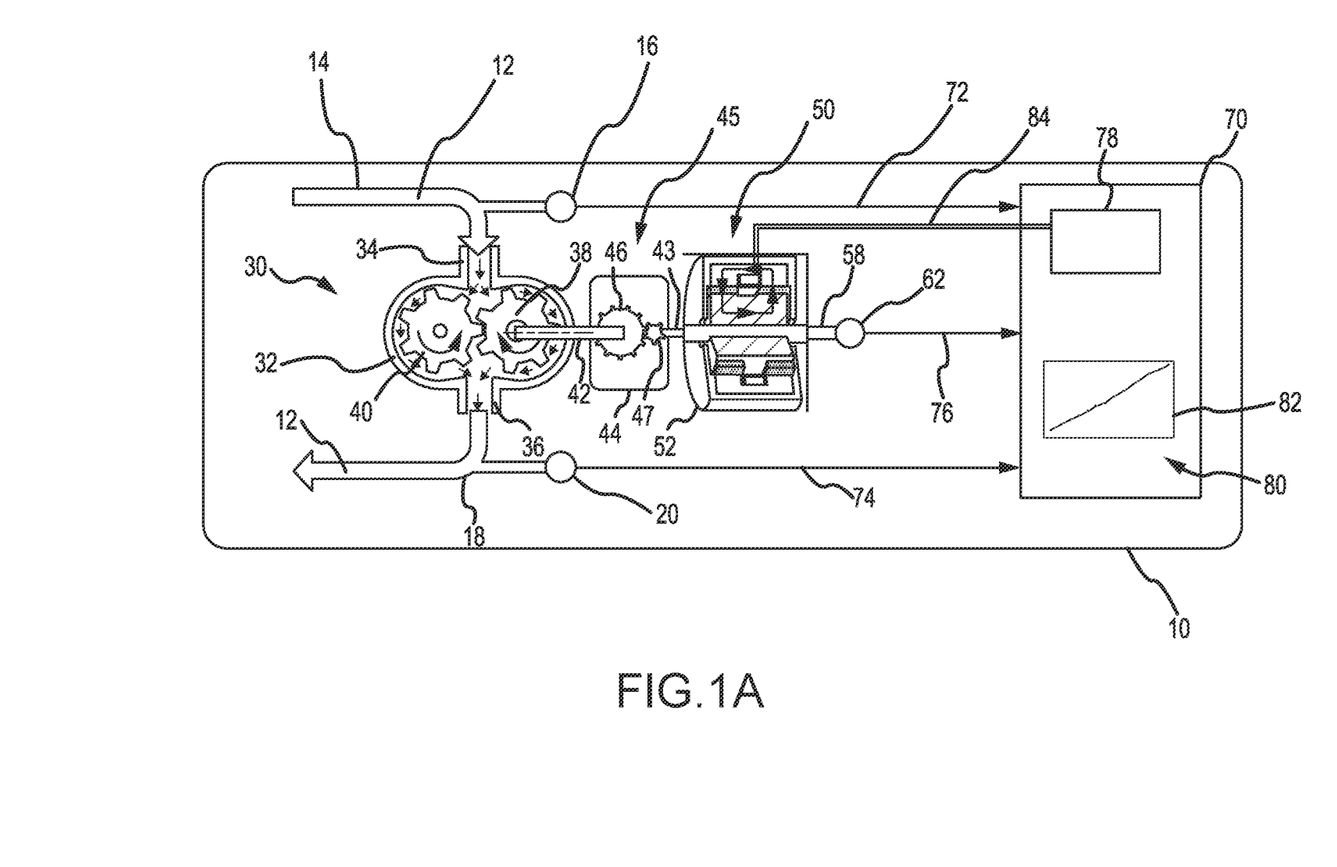
FIG. 1A is a schematic of a hydraulic fluid system that uses a hydraulic motor, gear box, and separate MRF brake, in accordance with various embodiments.

A hydraulic fluid system in accordance with various embodiments is illustrated in FIGS. 1A and is identified by reference numeral 10. The hydraulic fluid system 10 includes a hydraulic motor 30 (e.g., a gear pump), a reduction gear box 45, a magneto-rheological fluid (MRF) brake 50, and a controller 70. The hydraulic motor 30, reduction gear box 45, and MRF brake 50 are separate components in the case of the hydraulic fluid system 10, and may be disposed in spaced relation to one another. Generally, the MRF brake 50 may be operated to control a magnitude of a braking torque exerted on the hydraulic motor 30, and the magnitude of this braking torque is adjustable. The magnitude of braking torque exerted on the hydraulic motor 30 may be adjusted using reduction gear box 45. In the case of the hydraulic fluid system 10, the hydraulic motor 30 may be characterized as an adjustable orifice for the hydraulic fluid system 10 (e.g., fluid pressure from one or more devices fluidly connected with the hydraulic motor 30 drive the hydraulic motor 30 (e.g., a gear pump 30), and the MRF brake 50 and reduction gear box 45 would in turn be used to control how the hydraulic motor 30 resists the fluid pressure from each such device). The hydraulic motor 30, reduction gear box 45, MRF brake 50, and controller 70 collectively control the flow of the hydraulic fluid 12 within the hydraulic fluid system 10 and the pressure of the hydraulic fluid 12 within the hydraulic fluid system 10. Representative applications of the hydraulic fluid system 10 include a hydraulic damper (e.g., a shimmy damper for nose wheel steering on an aircraft, as an adjustable orifice to control the "free fall" characteristics of hydraulically-actuated landing gear for aircraft, or any other application that would benefit from having a hydraulic fluid restriction (the combination of the hydraulic motor 30, reduction gear box 45, and MRF brake 50) that can be controlled quickly and in real time.

A hydraulic fluid 12 of any appropriate type is directed through a hydraulic fluid input line 14 and into an input port 34 of a motor housing 32 of the hydraulic motor 30. A hydraulic fluid output line 18 extends from an output port 36 of the motor housing 32. The hydraulic fluid input line 14, the hydraulic fluid output line 18, or both, may be interconnected with a hydraulic fluid source, such as an accumulator, and one or more other devices. At least one pressure transducer/sensor 16 may be associated with the hydraulic fluid input line 14, at least one pressure transducer/sensor 20 may be associated with the hydraulic fluid output line 18, or both.

The hydraulic motor 30 may include an output gear 38 and an idler gear 40. Hydraulic fluid 12 that enters the motor housing 32 simultaneously rotates the output gear 38 and idler gear 40. An output shaft 42 may be interconnected and rotate with the output gear 38. The output shaft 42 may also extend to the reduction gear box 45.

An exemplary reduction gear box 45 is illustrated in FIG. 1A. The reduction gear box 45 includes a gear housing 44. The gear housing 44 may be spaced from the motor housing 32. The hydraulic fluid system 10 may also be configured such that the motor housing 32 and the gear housing 44 do not share any common housing sections.

The reduction gear box 45 includes a first gear 46 coupled to the output shaft 42 and a second gear 47 coupled to a reduction shaft 43. The first gear 46 and the second gear 47 are contained within gear housing 44 with output shaft 42 and reduction shaft 43 passing through gear housing 44. In various embodiments, more than two gears may be used, such as for example, with a planetary gear assembly, a double reduction gearbox, a right-angle worm reduction gearbox, and a helical gearbox, among others.

In the depicted embodiment, first gear 46 is larger than second gear 47. The ratio of the gears 46, 47 may be greater than about 2:1. In various embodiments, the ratio of the gears 46, 47 may be about 2:1 to about 20:1. In various embodiments, the ratio of the gears 46, 47 may be about 3:1 to about 15:1. In various embodiments, the ratio of the gears 46, 47 may be about 5:1 to about 10:1. In this way, the rotation speed of the output shaft 42 may be lower than the rotation speed of the reduction shaft 43. Similarly, the torque of the output shaft 42 may be higher than the torque of the reduction shaft. In various embodiments, the diameter of the output shaft 42 may be about the same as the diameter of the reduction shaft 43. In various embodiments, the diameter of the output shaft 42 may be larger than the diameter of the reduction shaft 43. In such embodiments, the difference in size between the output shaft 42 and the reduction shaft 43 reduces the overall weight of the hydraulic fluid system 10 as the MRF brake 50 may be smaller as well.

Figure 1B:
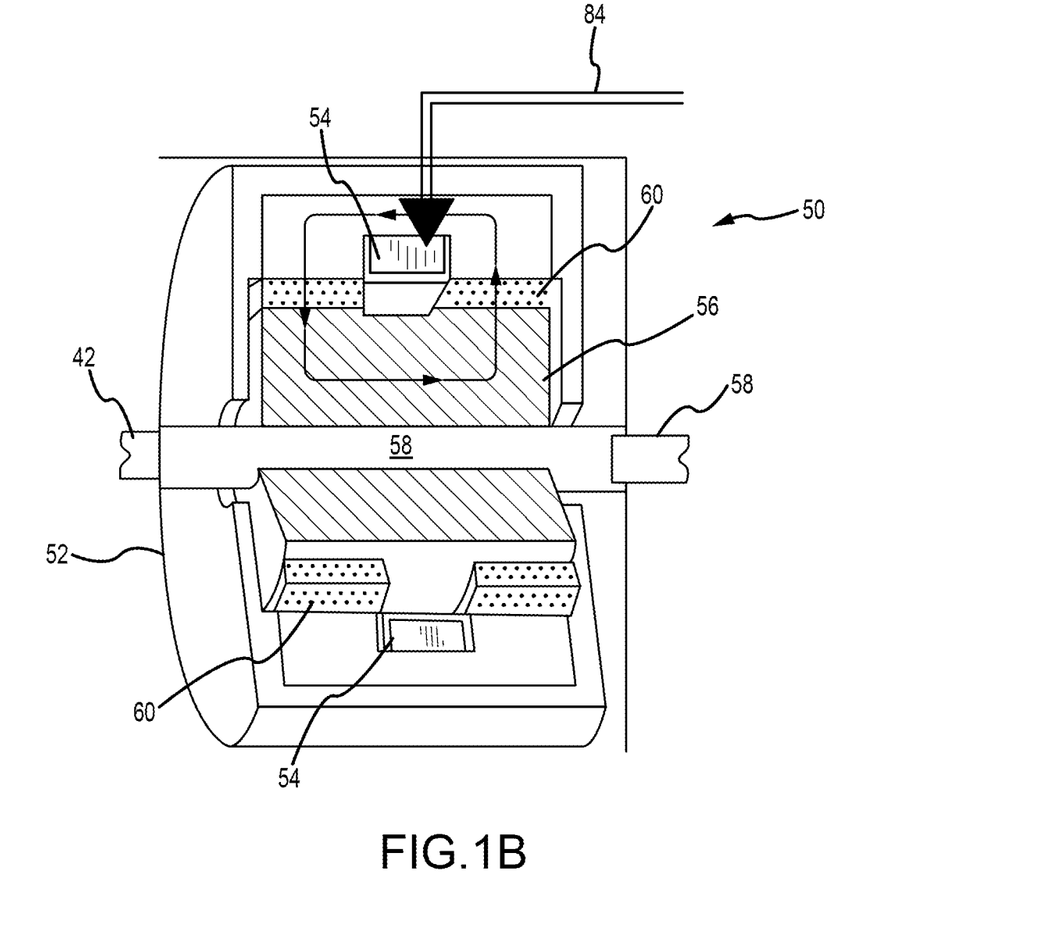
FIG. 1B is an enlarged view of the MRF brake used by the hydraulic fluid system shown in FIG. 1A.

The MRF brake 50 is illustrated in FIGS. 1A and 1B. The MRF brake 50 includes a brake housing 52. The brake housing 52 may be spaced from the gear housing 44. The hydraulic fluid system 10 may also be configured such that the gear housing 44 and brake housing 52 do not share any common housing section. In various embodiments, the hydraulic fluid system 10 may be configured such that gear housing 44 and brake housing 52 share at least one common housing section. In various embodiments, the MRF brake 50 and the reduction gear box 45 are combined into a single unit sharing a housing, either gear housing 44 or brake housing 52.

The MRF brake 50 includes a magnetic coil 54, a rotor 56, and a rotor shaft 58. The reduction shaft 43 of the reduction gear box 45 may be coupled with the rotor shaft 58 of the MRF brake 50 such that the reduction shaft 43, rotor shaft 58, and rotor 56 collectively rotate at a common rotational speed (with rotor 56 and rotor shaft 58 being rotatable relative to the brake housing 52). A speed transducer/sensor 62 may be associated with the rotor shaft 58 (e.g., to monitor a rotational speed of the rotor shaft 58).

At least a portion of at least one of the rotor 56 and rotor shaft 58 may be exposed to a magneto-rheological fluid 60, including with the rotor 56 is disposed in the magneto-rheological fluid 60. A fixed quantity of the magneto-rheological fluid 60 may be contained/retained within the brake housing 52. Stated another way, the magneto-rheological fluid 60 may be incorporated so as to not be recirculated through the brake housing 52 (e.g., the magneto-rheological fluid 60 does not flow from a fluid source (e.g., an accumulator) through one or more input ports of the brake housing 52, and then exit the brake housing 52 through one or more output ports and then back to the fluid source during operation of the MRF brake 50).

The controller 70 may be operatively interconnected with the MRF brake 50 by an electrical signal control line 84 that extends from the controller 70 to the magnetic coil 54 of the MRF brake 50. Generally, an electrical control signal is sent from the controller 70 to the magnetic coil 54 via the control line 84. Increasing the current of this electrical control signal increases the viscosity of the magneto-rheological fluid 60 in the MRF brake 50, which increases the braking torque applied by the MRF brake 50 to the reduction shaft 43 of the reduction gear box 45. Similarly, decreasing the current of this electrical control signal decreases the viscosity of the magneto-rheological fluid 60 in the MRF brake 50, which decreases the braking torque applied by the MRF brake 50 to the reduction shaft 43 of the reduction gear box 45 with a corresponding decrease in braking to the hydraulic motor 30.

A high pressure signal line 72 may extend from the pressure transducer 16 of the hydraulic motor 30 to the controller 70 (an input to the controller 70). A low pressure signal line 74 may extend from the pressure transducer 20 of the hydraulic motor 30 to the controller 70 (an input to the controller 70). A rotational speed signal line 76 may extend from the speed transducer/sensor 62 to the controller 70.

The controller 70 may be configured to utilize a pressure control logic. The monitored pressure on the input side of the hydraulic motor 30 (via pressure transducer 16) and the monitored pressure on the output side of the hydraulic motor 30 (via pressure transducer 20) may be used to determine a corresponding differential pressure between the input side and output side of the hydraulic motor 30, and this differential pressure may be used to generate an electrical control signal that provides a corresponding braking torque. A data structure 82 (e.g., a look-up table) in memory 80 (e.g., computer-readable) may correlate a certain differential pressure to a braking torque and an associated current for the electrical control signal.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se.

An MRF brake driver 78 of the controller 70 may generate and send an electrical control signal to the coil 54 of the MRF brake 50 (via the electrical signal control line 84) that yields the desired differential pressure (between the input side and output side of the hydraulic motor 30) and a corresponding desired braking torque (via producing a certain viscosity of the magneto-rheological fluid 60 via the current of the electrical control signal).

The controller 70 could also be configured to utilize a flow control logic. The flow rate through the hydraulic motor 30 may be correlated to a differential pressure between the input side of the hydraulic motor 30 (via pressure transducer 16) and the output side of the hydraulic motor 30 (via pressure transducer 20). The data structure 82 (e.g., a look-up table) in memory 80 may correlate a certain rotational speed of the rotor shaft 58 to a braking torque and an associated current for the electrical control signal. The MRF brake driver 78 of the controller 70 may generate and send an electrical control signal to the coil 54 of the MRF brake 50 (via the control line 84) that yields a desired rotational speed of the rotor shaft 58 and a corresponding desired braking torque (via producing a certain viscosity of the magneto-rheological fluid 60 via the current of the electrical control signal).

Generally, the flow rate of the hydraulic fluid system 10 is limited by the practical speed limit of the hydraulic motor 30. This dictates the minimal motor displacement and the torque, size, and weight of the MRF brake 50. The reduction gear box 45 overcomes this limitation and reduces the size of the MRF brake 50 for a given application. The reduction gear box 45 allows the hydraulic motor 30 to operate at lower speeds while reducing the braking torque of the MRF brake 50. This allows the MRF brake 50 to be smaller than otherwise possible by utilizing the higher torque-to-weight ratio of the reduction gear box 45. Therefore, while the reduction gear box 45 adds additional weight, the corresponding reduction in MRF brake 50 weight offsets the additional weight and provides improved performance.

Figure 2:
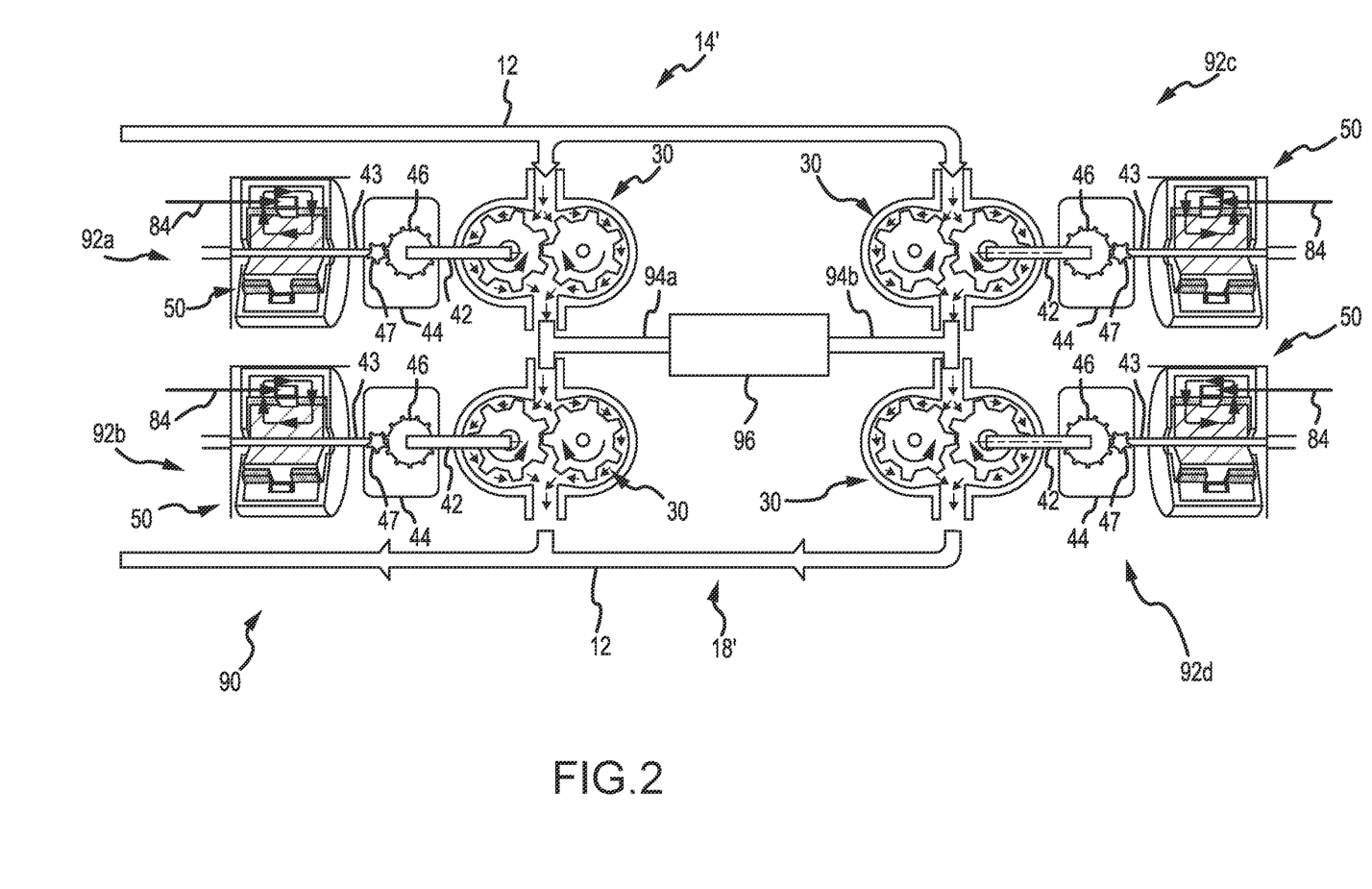
FIG. 2 is a schematic of a hydraulic fluid system that uses multiple gear boxes and MRF brakes, in accordance with various embodiments.

A hydraulic fluid system in accordance with various embodiments is illustrated in FIG. 2 and is identified by reference numeral 90. The hydraulic fluid system 90 includes four motor/gear/brake sets 92a, 92b, 92c, and 92d. The configuration of each of these motor/gear/brake sets 92a, 92b, 92c, and 92d is at least generally in accordance with the discussion presented above regarding FIGS. 1 and 1B. The motor/gear/brake sets 92a and 92b are disposed in series with one another, the motor/gear/brake sets 92c and 92d are disposed in series with one another, and the motor/gear/brake sets 92a, 92b are collectively disposed in parallel to the motor/gear/brake sets 92c, 92d. The motor/gear/brake sets 92a, 92b, 92c, and 92d in effect define a hydraulic bridge circuit. The output pressure and flow (magnitude and direction) may be controlled by adjusting the individual currents in the coil 54 of the four MRF brakes 50.

The hydraulic fluid input line 14' extends to the input port 34 of the hydraulic motor 30 of the motor/gear/brake sets 92a, 92c, while the hydraulic fluid output line 18' extends from the output port 36 of the hydraulic motor 30 of the motor/gear/brake sets 92b, 92d. A hydraulic line 94a extends from the output port 36 of the hydraulic motor 30 for the motor/gear/brake set 92a to the input port 34 of the hydraulic motor 30 for the motor/gear/brake set 92b, and also extends to a hydraulic load 96. A hydraulic line 94b extends from the output port 36 of the hydraulic motor 30 for the motor/gear/brake set 92c to the input port 34 of the hydraulic motor 30 for the motor/gear/brake set 92d, and also extends to the hydraulic load 96 (via an electrical control signal via the corresponding control line 84).

In the case of the hydraulic fluid system 90, the pressure in the hydraulic fluid input line 14' may be constant, and the pressure in the hydraulic fluid output line 18' may be constant. The motor/gear/brake sets 92a, 92b, 92c, and 92d in the case of the hydraulic fluid system 90 may be used to control the hydraulic load 96. Representative hydraulic loads 96 include without limitation an aircraft component. The hydraulic load 96 may be a hydraulic actuator (e.g., a wheel brake actuator of an aircraft to control brake torque), a hydraulic (rotary) motor that drives an actuator, a vehicle, or any other device that requires the conversion of hydraulic power (the product of flow and pressure) into another form of mechanical (motive) energy.

Figure 3:
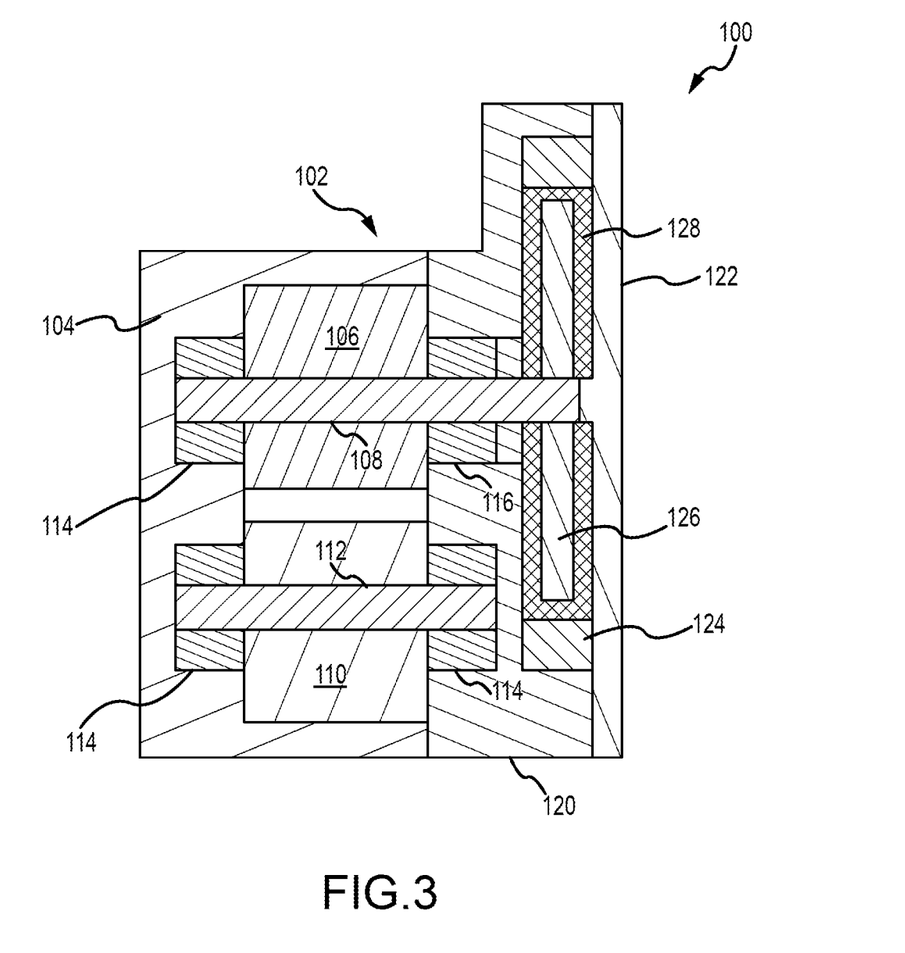
FIG. 3 is a schematic of a hydraulic fluid system that uses an integrated hydraulic motor, gear assembly, and MRF brake, in accordance with various embodiments.

A hydraulic fluid system in accordance with various embodiments is illustrated in FIG. 3 and is identified by reference numeral 100. Generally, a hydraulic motor or gear pump (e.g., hydraulic motor 30), a gear assembly (e.g., reduction gear box 45), and an MRF brake (e.g., MRF brake 50) are integrated into a common housing assembly 102. This housing assembly 102 includes a gear pump housing 104, a brake housing 120, and a cover plate 122. The brake housing 120 includes components for a gear assembly (e.g., reduction gear box 45) and an MRF brake (e.g., MRF brake 50), and furthermore closes an open end of the gear pump housing 104. The cover plate 122 seals an open end of the brake housing 120. The gear pump (e.g., hydraulic motor 30) includes an output gear 106 and an idler gear 110. An idler gear shaft 112 is associated and rotates with the idler gear 110. A shaft 108 is associated and rotates with each of the output gear 106 (gear pump) and a rotor 126 (gear assembly/MRF brake). Bearings 114 may rotatably support the shaft 108 and the idler gear shaft 112. A seal 116 may be mounted on the shaft 108 adjacent to the brake housing 120 and into which the shaft 108 extends. A magnetic coil 124 may be disposed within the brake housing 120, along with a magneto-rheological fluid 128 in which the rotor 126 is disposed. Two or more gears may be disposed within the brake housing, forming the gear assembly. An electrical control signal to the magnetic coil 124 may be used to control the braking torque exerted by the magneto-rheological fluid 128 on gear assembly and in turn on the rotor 126 (and any portion of the shaft 108 that also interfaces with this magneto-rheological fluid 128. Increasing the current of the electrical control signal to the magnetic coil 124 increases the viscosity of the magneto-rheological fluid 128, and thereby the increases the magnitude of the braking torque exerted by the magneto-rheological fluid 128 on the rotor 126, as translated through the gear assembly. Decreasing the current of the electrical control signal to the magnetic coil 124 decreases the viscosity of the magneto-rheological fluid 128, and thereby decreases the magnitude of the braking torque exerted by the magneto-rheological fluid 128 on the rotor 126, as translated through the gear assembly.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A hydraulic fluid system, comprising:
a hydraulic motor including an output shaft;
a reduction gear box having a first side and an opposing second side, the reduction gear box being coupled to the output shaft at the first side and coupled to a reduction shaft at the second side, wherein the output shaft has a first diameter and the reduction shaft has a second diameter, the second diameter being smaller than the first diameter; and a magneto-rheological fluid (MRF) brake coupled to the reduction shaft.

2. The hydraulic fluid system of claim 1, wherein the hydraulic motor further comprises:
an idler gear; and
an output gear, the output gear being coupled to the output shaft.

3. The hydraulic fluid system of claim 1, wherein the reduction gear box further comprises:
a first gear coupled to the output shaft; and
a second gear configured to operate with the first gear, the second gear being coupled to the reduction shaft.

4. The hydraulic fluid system of claim 3, wherein the reduction gear box has a reduction ratio of about 2:1 to about 20:1.

5. The hydraulic fluid system of claim 1, wherein the reduction gear box further comprises a planetary gear having an input coupled to the output shaft and an output coupled to the reduction shaft.

6. The hydraulic fluid system of claim 1, wherein the hydraulic motor, the reduction gear box, and the MRF brake define a first set, the hydraulic fluid system further comprising:
a second hydraulic motor;
a second reduction gear box coupled to the second hydraulic motor; and
a second MRF brake coupled to the second reduction gear box, wherein the second hydraulic motor, the second reduction gear box, and the second MRF brake define a second set, and wherein the first set and the second set are connected in series.

7. The hydraulic fluid system of claim 1, wherein the MRF brake comprises a controller configured to receive an input based on an operation of the hydraulic motor.

8. The hydraulic fluid system of claim 1, further comprising:
a first housing enclosing the hydraulic motor; and
a second housing enclosing the reduction gear box and the MRF brake, the first housing being completely separate from the second housing.

9. A hydraulic fluid system, comprising:
a hydraulic motor having a first output shaft;
a gear box having a second output shaft, the gear box being coupled to the first output shaft, wherein the first output shaft has a first diameter, wherein the second output shaft has a second diameter, and wherein the first diameter is larger than the second diameter; and
a magneto-rheological fluid (MRF) brake having a third output shaft, the MRF brake being coupled to the second output shaft.

10. The hydraulic fluid system of claim 9, further comprising:
a speed sensor associated with the third output shaft; and
a controller configured to receive input from the speed sensor and control the MRF brake in response to the input received from the speed sensor.

11. The hydraulic fluid system of claim 9, wherein the gear box further comprises:
an input gear coupled to the first output shaft; and
an output gear coupled to the input gear, wherein the output gear is configured to drive the second output shaft.

12. The hydraulic fluid system of claim 11, wherein the input gear is larger than the output gear.

13. The hydraulic fluid system of claim 12, wherein a ratio of the input gear to the output gear is about 5:1 to about 10:1.

14. The hydraulic fluid system of claim 11, wherein the input gear and the output gear are part of a planetary gear.

15. The hydraulic fluid system of claim 9, further comprising:
a first housing enclosing the gear box and the MRF brake; and
a second housing enclosing the first housing and the hydraulic motor.

16. A hydraulic fluid system, comprising:
a hydraulic motor configured;
a reduction gear assembly including an input gear coupled to a first shaft and an output gear operatively coupled to the hydraulic motor via a second shaft, the first shaft having a first diameter, and the second shaft having a second diameter that is less than the first diameter;
a magneto-rheological fluid (MRF) brake operatively coupled to the hydraulic motor through the reduction gear assembly; and
a controller configured to control a braking torque of the MRF brake to manage a speed of the hydraulic motor.

17. The hydraulic fluid system of claim 16, wherein a ratio of input gear to the output gear is greater than 2:1.

18. The hydraulic fluid system of claim 16, wherein a ratio of input gear to the output gear is about 3:1 to about 15:1.

* * * * *